May 11, 1937. J. PAVLECKA 2,079,923

THERMAL POWER PLANT

Filed Jan. 4, 1935

INVENTOR:
John Pavlecka

Patented May 11, 1937

2,079,923

UNITED STATES PATENT OFFICE 2,079,923

THERMAL POWER PLANT

John Pavlecka, Detroit, Mich.

Application January 4, 1935, Serial No. 398

21 Claims. (Cl. 60—108)

My present invention relates particularly to a novel co-ordination of the usual units that constitute a thermal power plant, and has as one of its objects to secure certain structural advantages as well as higher efficiency of operation.

Another object of my invention is to devise a light and simple elastic fluid power plant for vehicles, boats, aircraft and central stations.

A still further object is to provide a highly economical power plant wherein waste heat is reintroduced into the process of power generation particularly in the form of preheated air for combustion.

Another object is to devise a self-contained elastic fluid power plant of compact size into which fuel is fed at one end and power delivered at the other end.

My invention resides essentially in grouping the several units that make up an elastic fluid power plant into a progressive functional relation, i. e., disposing the fluid generator and superheater directly at the prime mover, arranging the condenser for the expanded fluid in juxtaposition of the exhaust end of the prime mover or around it, and enclosing these main units by and in a tubular shell or duct; this shell is provided at one end with means for delivering air at high velocity into it, and at the other end is closed whereby the air is forced into the combustion chamber of the fluid generator and superheater which is located thereat. In passing through the shell from its receiving end to its terminal end, the air has to sweep along and through the condenser and along the generator and superheater and in doing so absorbs waste heat from their surfaces and enters the combustion chamber in a preheated state and thus facilitates combustion at a rapid rate.

The manner in which this principle of waste heat recuperation is utilized structurally is represented in two typical embodiments as illustrated in the drawing accompanying this specification and forming an integral part of it.

Figure 1:
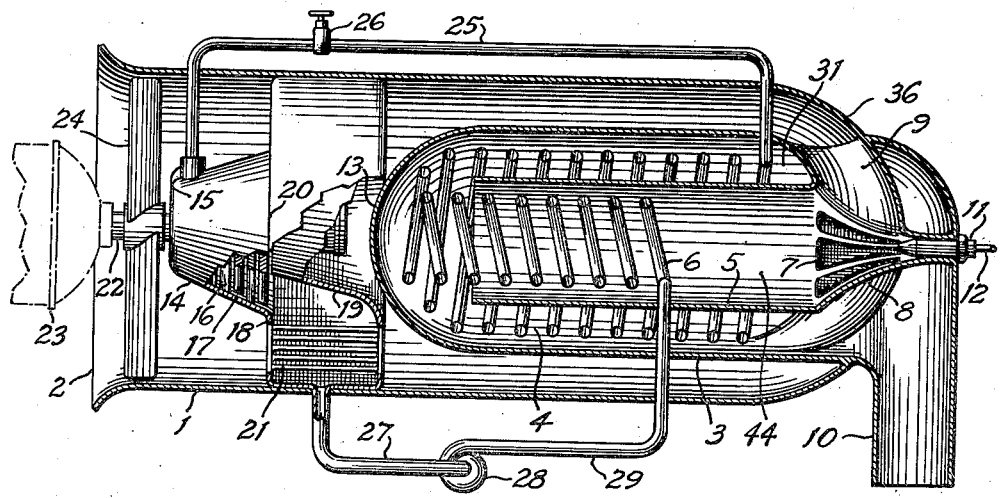
Fig. 1 represents a longitudinal diagrammatic cross-section through an embodiment of my invention suitable for fixed or mobile installation as in central stations or in vehicles.

Referring jointly to both figures, the power plant forming subject matter of this invention comprises basically the elastic fluid generator and superheater 4, which may be of any suitable type and construction in which liquid fluid is vaporized and the vapor superheated in a series of coils 6 which are arranged between the combustion chamber 44 and the exhaust end 31; or, in embodiments operating for instance on the "Loeffler" principle, the coils 6 serve as a superheater into which vapor is introduced. In any case, the apparatus 4 is a heat exchanger between two media, and is herein further referred to as such.

Figure 2:
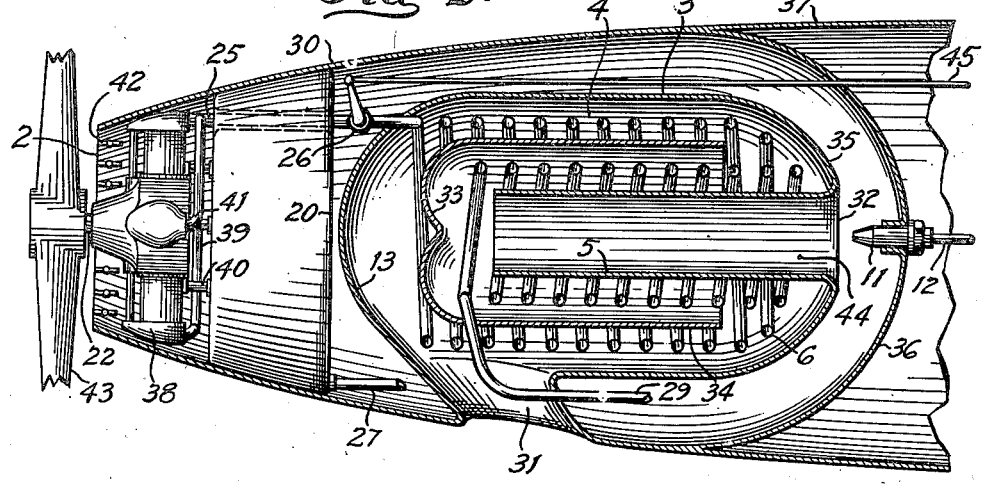
Fig. 2 is a similar cross-section through the fuselage or nacelle of an aircraft and shows the disposition of the power plant therein.

From the heat exchanger 4 the superheated fluid is led into a prime mover which may be either an elastic fluid turbine 14 in Fig. 1, or a piston engine 38 in Fig. 2, either of which is located in proximity of the heat exchanger 4, preferably in axial alinement with it. Adjacent the prime mover 14 or 38, respectively, or thereabouts is positioned the condenser or heat radiator 20 into which expanded fluid is discharged from the prime mover and where it is converted into a liquid.

These three major units of the power plant, the heat exchanger, the prime mover and the condenser, are enclosed in the tubular shell or duct 1 which is adapted to receive air at one end 2 thereof, and at the other end terminates with the closure 36, and between these ends assumes any desired or practical form and cross-section, such as cylindrical, conical or irregular. The receiving end 2 of the duct 1 is open and means for accelerating air into it is provided thereat, such as the fan 24 in Fig. 1 or the propeller 43 in Fig. 2. At the opposite end 36, the duct 1 is formed to gradually concentrate the flow of air and guide it into the heat exchanger 4 which is located centrally at that end; the heat exchanger 4 may either project through the closure 36 of the duct exteriorly as in Fig. 1, or may be spaced therefrom as in Fig. 2 and shaped to form a smooth passage for the air between its end and the closure 36.

The heat exchanger 4 is, in the preferred form, constructed of at least two tubular flues 3 and 5, the inner one 5 providing the combustion space 44, and the outer one 3, including the closed end 13, providing the exterior shell of the heat exchanger with the exhaust passage 31 therein; between the combustion space 44 and the passage 31 is arranged a series of coils of tubing 6. The exhaust passage 31 may be at the same axial end of the heat exchanger as the combustion chamber 44 therein, as in Fig. 1, or at the opposite axial end, as in Fig. 2, depending upon the number of flues used.

Referring now specifically to Fig. 1, the power plant represented here is composite of the duct 1 which, by way of example, is shown as being cylindrical and as having the receiving end 2 for air open; the terminal end 36 is shaped into a spherical form the central portion of which is occupied by the heat exchanger 4. The heat exchanger 4 comprises the exterior flue 3 which is closed at the fore end 13 thereof with a spherical surface, and at the aft end passes through the closure 36 and exteriorly thereof conjoins to the exhaust stack 10. In the flue 3, coaxially with it is disposed the inner flue 5 which includes the combustion chamber 44 at and in the far end thereof and at that end terminates with the conical tuyère 8 which protrudes axially with its apex through the stack 10 and provides a holder for the fuel injection nozzle 11 therein. The nozzle 11 is removable from the outside and is connected to the fuel line 12. The conical wall of the tuyère 8 is provided with a number of orifices 7 each of which is the outlet for one air port 9; these air ports 9 communicate radially between the tuyère 8 and the interior of the duct 1 through the exhaust passage 31 in the flue 3. The coils of tubing 6 arranged in the flues 5 and 3 between the combustion chamber 44 and the exhaust passage 31 therein are connected to the feed line 29 at one end, and to the main line 25 at the other end, the latter line carrying superheated fluid to the prime mover 14.

The prime mover 14, which in this particular case is a turbine, is located preferably, though not necessarily, in the duct 1 between the receiving end 2 thereof and the heat exchanger 4 therein, and has the driven shaft 22 which projects exteriorly through the end 2 of the duct 1 and is coupled to any driven apparatus thereat, such as the electric generator 23. The turbine 14 has a high pressure end into which the motive fluid is admitted at point 15 by the control valve 26 in the line 25, and a low pressure end 18, and between these extremities comprises a number of rows of stationary blading 16, and intermediate rows of rotating blading 17 driving the shaft 22.

The low pressure end 18 of the turbine 14 is directly connected to the condenser 20; in the preferred form as shown this condenser is characterized by an annular core which occupies the whole space between the exhaust end 18 and the exhaust shell 19 of the turbine, and the duct 1. The condensate collects at the bottom of the condenser 20 and is drained off through line 27 and eventually or readily returned by the pump 28 and the line 29 into the coils 6.

The air for combustion in the heat exchanger 4 is supplied forcibly into the duct 1, for which purpose a blower is employed; in the embodiment shown in Fig. 1, the blower 24 is disposed at the intake end 2 of the duct 1 between the high pressure end of the turbine 14 and the exterior generator 23, and being mounted on the shaft 22 of the turbine 14, is directly driven by it.

The structural disposition of the units of the power plant as disclosed hereinabove is devised with the aim of conserving as much of the waste heat from the prime mover 14 and the heat exchanger 4 as feasible, and this aim is achieved by transferring the waste heat, or a portion thereof, to the air as it sweeps through the duct 1 on its way to and into the combustion chamber 44. If atmospheric air is induced in, the blower 24 is made use of to accelerate air inwardly into the duct 1; on its way, the air must first pass through the condenser 20 in the core of which a large number of small cellular or tubular passages 21 convey the air at high velocity between the fore and aft ends thereof and thus effect a rapid transfer of the latent heat of the fluid to the air. After its exit from the condenser 20, the air reaches the exterior flue 3 of the heat exchanger 4, and travelling along its length at high velocity in the circumferential clearance between this flue 3 and the duct 1, the air collects the heat radiated by and conveyed through the flue 3, thereby attaining a high temperature which is further increased as the air reaches the terminal end 36 of the duct 1 and is diverted into the ports 9 which lead into the chamber 44. In this chamber the air mixes with a jet of fuel, burns, and the flue gases follow a circuitous path through the heat exchanger as they are reversed in their course at least once and have to find their way between the coils of tubing 6 therein before finally reaching the exhaust passage 31 and being discharged through the stack 10.

The embodiment of Fig. 2 is characterized by the same principle of construction and operation as the one of Fig. 1, except for the different type of the prime mover and a modified heat exchanger, by way of example. This embodiment is an installation of my new power plant in an aircraft fuselage or nacelle 37 the forward portion 30 of which provides an air duct corresponding to the duct 1 in Fig. 1, by itself. The shell 30 tapers forwardly to the open aperture 2 through which air is either scooped in in flight, or is accelerated in by a special impeller as disclosed in my Letters Patent No. 2,022,900 and No. 1,779,186. From the aperture 2 the shell 30 increases in girth along the usual aerodynamic contour until at a distance from its forward end it is partitioned off from the remainder of the interior of the body 37 by the bulkhead 36 which is formed as a substantially spherical surface.

The heat exchanger 4 in this embodiment comprises the outer tubular flue 3, the intermediate flue 34, and the inner flue 5 which includes the combustion chamber 44. The outer flue 3 is provided at the fore and aft ends thereof with convex closures 13 and 35, respectively, the aft one 35 of which makes a juncture with the inner flue 5 at and around the open intake end 32 thereof. The convex surface 35 of the flue 3 in co-ordination with the spherical bulkhead 36 jointly form a gradual and smooth approach for air from the periphery of the heat exchanger 4 inwardly to the central intake 32 thereof and the combustion chamber 44 therein. The intermediate flue 34 is closed at the fore end 33 thereof opposite the intake 32, and open at the other end, at both of which ends the flue gases are reversed in their path through the heat exchanger before being discharged through the exhaust passage 31 in close proximity of the fore end 13 of the exterior flue 3.

The prime mover is represented by the piston engine 38 which is, by way of example, of the radial four cylinder type; the cylinders have each one intake conduit 41 and one exhaust conduit 40, the conduits 41 being supplied collectively with the motive fluid from the pipe line 25 by the manifold 39. The admission of the fluid is controlled by the throttle 26 and the rod 45. The prime mover 38 has the driving shaft 22 which projects centrally through the aperture 2 and supports the propeller 43 rotatably thereat.

Between the prime mover 38 and the heat exchanger 4 is located the condenser 20 which fills in the whole cross-sectional area of the shell 30 at that point, and is connected with the prime mover 38 through the exhaust ports 40. The condensate is taken off at the bottom through the line 27, and is either re-introduced into the coils 6 or taken into an evaporator.

In an installation of this character where sudden shut-downs and rapid releases of power are required, a means for controlling the flow of air into the system is essential, and is provided by a plurality of shutters 42 in the shell 30 anywhere between its extremities and preferably at the receiving end 2 for air as shown, so that while no power is generated the prime mover 38 and the heat exchanger 4 will not cool off but will be in a condition to resume operation instantly. The control of the shutters 42 is effected preferably in the manner disclosed in my Patent No. 2, 022,-900 above mentioned, i. e., in synchronism with the control of the throttle 26.

I claim:

1. Means for preheating air for combustion in elastic fluid power plants consisting of a number of thermal units by utilizing the heat by both convection and radiation from said units comprising, a shell having a receiving extremity for air and a discharge extremity for feeding said air into said power plant for combustion therein, said shell enclosing substantially the whole of said power plant between said extremities thereof.

2. Means for preheating air for combustion in thermal power plants consisting of a plurality of units having a varying degree of temperature difference with respect to atmosphere, comprising, a shell having an entry and a discharge end for air, said units of said power plant being disposed in said shell between said ends thereof in the order of their increasing temperature difference.

3. In a thermal power unit, a heat exchanger having a central combustion chamber and a flue gas passage surrounding said chamber, air ports communicating between the exterior of said exchanger and said combustion chamber therein through said flue gas passage for preheating air by flue gases, and blower means supplying air into said ports.

4. In a thermal power plant, a heat radiator, a heat exchanger having an air intake and a combustion chamber and an exhaust passage, said exhaust passage surrounding said combustion chamber, and means for preheating air for combustion by conveying same past and along said heat radiator and said heat exchanger and through said exhaust passage to and into said combustion chamber therein.

5. In a thermal power plant, a steam generator having an air intake, a heat radiator, and a duct having a receiving end for air and a terminal end, said steam generator being disposed in said duct with said air intake thereof at said terminal end of said duct and said radiator being positioned in said duct between said receiving end thereof and said steam generator therein whereby air passing through said duct to said air intake will be preheated first by said radiator and then by said steam generator.

6. In a thermal power plant, a heat exchanger having a central air intake, a heat radiator, a duct having a receiving end for air and a terminal end, means for accelerating the air in said duct from said receiving end to said terminal end thereof, said radiator having the surface thereof exposed to the air passing through said duct, said heat exchanger being disposed in said duct with said air intake thereof facing said terminal end of said duct and being spaced therefrom, said terminal end of said duct and said heat exchanger being formed to jointly provide an approach for the air from the periphery of said heat exchanger toward said central intake thereof.

7. In a thermal power plant, a heat exchanger having a central combustion chamber and a flue gas passage or passages at and around said chamber, a heat radiator, a duct having a receiving end for air and a terminal end, means for accelerating the air in said duct from said receiving end to said terminal end thereof, said radiator having the surface thereof exposed to the air passing through said duct, said heat exchanger being disposed in said duct at said terminal end thereof, and an air port or ports communicating between said combustion chamber and the exterior of said heat exchanger through said flue gas passage or passages therein whereby said air will be preheated first by said radiator, then by said heat exchanger, and finally in said port or ports.

8. In a thermal power plant, a heat exchanger comprising a plurality of flues one inside of another, the innermost flue providing a combustion chamber and having an air intake at one end thereof, the outermost flue providing the exterior of said heat exchanger and at one end thereof making a juncture with said innermost flue at and around said air intake therein, and having an exhaust passage at the other end, tubing containing a fluid arranged in said flues between said combustion chamber and said exhaust passage therein; a duct having a receiving end for air and a terminal end, means for accelerating the air in said duct from said receiving end to said terminal end thereof, a heat radiator exposed to the air passing in said duct for preheating said air, said heat exchanger being disposed in said duct with said air intake thereof facing said terminal end of said duct and being spaced therefrom, said terminal end of said duct and said heat exchanger jointly forming an approach for the air from the periphery of said heat exchanger to and into said air intake thereof, and fuel injection means projecting through said terminal end of said duct into said air intake of said heat exchanger.

9. In a thermal power plant, a heat exchanger comprising at least two flues one inside of another, the innermost flue providing a combustion chamber, a tuyère conjoining said innermost flue at said combustion chamber and tapering to an apex therefrom, the outermost flue providing the exterior of said heat exchanger and at one end thereof surrounding said tuyère with an exhaust passage, and being closed at the other end, a plurality of air ports communicating between the interior of said tuyère and the exterior of said heat exchanger through said exhaust passage therein, tubing containing a fluid arranged in said flues between said combustion chamber and said exhaust passage therein; a duct having a receiving end for air and a terminal end, means for accelerating the air in said duct from said receiving end to said terminal end thereof, a heat radiator exposed to the air passing in said duct for preheating said air, said heat exchanger being disposed in said duct so that said outermost flue thereof beyond said air ports therein projects through said terminal end of said duct, said tuyère protruding exteriorly from said duct and said heat exchanger, and fuel injection means in said tuyère.

10. In a thermal power plant, a tubular shell having a receiving end for air and a terminal end, a heat exchanger having an air intake and an exhaust, a prime mover having a driving shaft, a condenser, means for accelerating the air in said shell from said receiving end to said terminal end thereof, and fuel injection means for said heat exchanger, said heat exchanger, prime mover and condenser being disposed in said shell at and between said ends thereof with said injection means projecting into said shell at said terminal end thereof and said shaft projecting from said shell at said receiving end for air thereof.

11. In a thermal power plant, a tubular shell having a receiving end for air and a terminal end, a heat exchanger having an air intake and an exhaust, a condenser, and a driven blower, said heat exchanger being disposed in said shell with said air intake thereof at said terminal end of said shell, said blower being located at said receiving end of said shell, and said condenser being positioned between said blower and said heat exchanger whereby the air delivered by said blower into said air intake of the heat exchanger will be preheated by the waste heat of both said condenser and said heat exchanger.

12. In a thermal power plant, a tubular shell having a receiving end for air and a terminal end, a heat exchanger having an air intake and an exhaust, a prime mover having a driving shaft, a condenser, and a blower, said heat exchanger being disposed in said shell at said terminal end thereof, said condenser being positioned between said receiving end of said shell and said heat exchanger therein, said prime mover having said shaft thereof projecting into said receiving end of said shell and said blower being mounted on said shaft thereat whereby the air delivered by said blower into said air intake of the heat exchanger will be preheated by the waste heat of both said condenser and said heat exchanger.

13. In a thermal power plant, a tubular shell having a receiving end for air and a terminal end, a heat exchanger having an air intake and an exhaust, a condenser, said heat exchanger being disposed in said shell at said terminal end thereof, said condenser being positioned between said receiving end of said shell and said heat exchanger therein whereby air for combustion in said heat exchanger will be preheated first by said condenser and then by said heat exchanger, means for supplying air forcibly into said shell, and adjustable means for regulating the amount of air passing through said shell.

14. In a thermal power plant, a tubular shell having a receiving end for air and a terminal end, a heat exchanger having an air intake and an exhaust, a prime mover having a driving shaft, a condenser, a blower, and a plurality of shutters, said heat exchanger being disposed in said shell at said terminal end thereof, and said prime mover, condenser and shutters being positioned between said receiving end of said shell and said heat exchanger therein with said shaft of said prime mover projecting through said receiving end outwardly and mounting said blower thereat whereby the air delivered by said blower into said air intake of the heat exchanger will be preheated by the waste heat of both said condenser and said heat exchanger.

15. In a thermal power plant, a tubular shell having a receiving end for air and a terminal end, a heat exchanger having an air intake and an exhaust, a prime mover, and a condenser, said condenser being integral with said prime mover, said heat exchanger being disposed in said shell at said terminal end thereof, and said prime mover being located in such a relation to said shell whereby said condenser will be positioned in said shell between said receiving end thereof and said heat exchanger therein whereby air for combustion in said heat exchanger will be preheated first by said condenser and then by said heat exchanger.

16. In an aircraft, a tubular shell having an aperture at the forward extremity thereof and being closed at a distance from said aperture, a heat exchanger having an air intake and an exhaust, said exchanger being disposed in said shell with said intake thereof at said closed end of said shell, fuel injection means projecting into said air intake at said closed end of said shell, a prime mover having a driving shaft, a propeller on said shaft, a condenser, and a plurality of shutters, said condenser, prime mover and shutters being positioned between said forward extremity of said shell and said heat exchanger therein with said shaft of said prime mover projecting outwardly through said aperture of said shell and mounting said propeller thereat whereby the air forced into said shell through said aperture will be preheated for combustion in said heat exchanger by both said condenser and said heat exchanger therein.

17. In a thermal power plant, a heat exchanger comprising a plurality of flues one inside of another, the innermost flue providing a combustion chamber and having an air intake at one end thereof, the outermost flue providing the exterior of said heat exchanger and at one end thereof making a juncture with said innermost flue at and around said air intake therein, and having an exhaust passage at the other end, and tubing containing a fluid being arranged in said flues; a prime mover having a driving shaft, a condenser, a blower, and a tubular shell having a receiving end for air and a terminal end, said heat exchanger being disposed in said shell with said air intake thereof facing said terminal end of said shell and being spaced therefrom, fuel injection means projecting through said terminal end of said shell into said air intake of said heat exchanger, said condenser and said prime mover being positioned between said receiving end of said shell and said heat exchanger therein with said shaft of said prime mover projecting through said receiving end and mounting said blower thereat whereby the air delivered by said blower into said air intake of the heat exchanger will be preheated by the waste heat of both said condenser and said heat exchanger.

18. In a thermal power plant, a heat exchanger comprising at least two flues one inside of another, the innermost flue providing a combustion chamber, a tuyère conjoining to said flue at said combustion chamber and tapering to an apex therefrom, the outermost flue providing the exterior of said heat exchanger and being closed at one end thereof and surrounding said tuyère with an exhaust passage at the other end, a plurality of air ports communicating between the interior of said tuyère and the exterior of said heat exchanger through said exhaust passage therein, and tubing containing a fluid arranged in said flues; a prime mover having a driving shaft, a condenser, a blower, and a tubular shell having a receiving end for air and a terminal end, said heat exchanger being disposed in said shell with said outermost flue thereof projecting beyond said air ports therein through said terminal end of said shell, said tuyère protruding exteriorly through said heat exchanger, and fuel injection means in said tuyère; said prime mover and condenser being positioned between said receiving end of said shell and said heat exchanger therein with said shaft of said prime mover projecting through said receiving end and mounting said blower thereat whereby the air delivered by said blower into said combustion chamber of the heat exchanger will be preheated first by said condenser, then by said heat exchanger and finally in said air ports.

19. In a thermal power unit, a heat exchanger having a central combustion chamber and a number of flue gas passages one inside of another, at least one of said passages surrounding said combustion chamber, air ports communicating from the exterior of the outermost of said flue gas passages with said combustion chamber, a shell enveloping said heat exchanger with an intervening clearance, said shell having an intake and a discharge end for air, said discharge end connecting with said ports in said heat exchanger, and blower means for supplying air into said intake end of said shell whereby said air will be preheated first by the outermost of said flue gas passages and then by said ports before entering said combustion chamber.

20. A vehicle comprising, a closed exterior shell structure, said structure having an entry end for air and a closed end opposite thereto, a power plant disposed in said structure between said ends thereof, means as a part of said power plant at said entry end for inducing air thereinto, and an elastic fluid generator forming a part of said power plant and being disposed at said closed end of said structure, said shell structure providing the means for preheating said induced air by the waste heat of said power plant by conveying same from the entry end thereof to and into said elastic fluid generator at the closed end thereof.

21. A vehicle comprising, a closed exterior shell structure having an open extremity for receiving air and a closed extremity at a distance therefrom, a power plant including a fluid generator, a prime mover, a condenser and blower means driven from said prime mover, said condenser and said blower means being located at said open extremity of said structure and said fluid generator being positioned at said closed extremity thereof with said prime mover disposed intermediate said extremities whereby the air delivered by said blower means into said structure will be preheated first by said condenser and then by said fluid generator for combustion therein.

JOHN PAVLECKA.